US012399577B2

(12) United States Patent
Chung et al.

(10) Patent No.: US 12,399,577 B2
(45) Date of Patent: Aug. 26, 2025

(54) STYLUS THREE-DIMENSIONAL TRAJECTORY PREDICTION

(71) Applicant: Google LLC, Mountain View, CA (US)

(72) Inventors: Vincent Chung, New Taipei (TW);
Chun-Hsi Chen, New Taipei (TW);
Chintan Trehan, Pleasanton, CA (US);
Ting Ye, New Taipei (TW); Fang Liu,
Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/405,164

(22) Filed: Jan. 5, 2024

(65) Prior Publication Data
US 2025/0224816 A1 Jul. 10, 2025

(51) Int. Cl.
G06F 3/0346 (2013.01)
G06F 3/0354 (2013.01)
G06F 3/038 (2013.01)

(52) U.S. Cl.
CPC ........ G06F 3/0346 (2013.01); G06F 3/03545 (2013.01); G06F 3/0383 (2013.01); G06F 2203/0384 (2013.01)

(58) Field of Classification Search
CPC .. G06F 3/0346; G06F 3/03545; G06F 3/0383; G06F 2203/0384
See application file for complete search history.

(56) References Cited

U.S. PATENT DOCUMENTS

| 2005/0013365 | A1* | 1/2005 | Mukerjee | H04N 19/587 375/E7.254 |
| 2015/0091832 | A1 | 4/2015 | Mizunuma et al. | |
| 2015/0153855 | A1* | 6/2015 | Bathiche | G06F 3/04883 345/173 |
| 2016/0334921 | A1 | 11/2016 | Oakley | |
| 2017/0242534 | A1 | 8/2017 | Gray | |
| 2019/0118808 | A1* | 4/2019 | Kawasaki | B60W 30/0956 |
| 2019/0235642 | A1* | 8/2019 | Tsai | G06F 3/03545 |
| 2019/0310738 | A1 | 10/2019 | Dyvik et al. | |
| 2022/0413637 | A1* | 12/2022 | Wu | G06F 3/03547 |

(Continued)

OTHER PUBLICATIONS

"Universal Stylus Initiative", Wikipedia, Available Online at: https://en.wikipedia.org/w/index.php?title=Universal_Stylus_Initiative&oldid=1177384883, Sep. 27, 2023, 2 pages.

Primary Examiner — Antonio Xavier
(74) Attorney, Agent, or Firm — Kilpatrick Townsend & Stockton LLP

(57) ABSTRACT

Various techniques for three-dimensional trajectory prediction of a stylus are described. An input device, such as a stylus, includes an integrated Inertial Measurement Unit (IMU) (e.g., 3-axis, 6-axis, 9-axis, ... ) that generates IMU data that is used to predict a future location of the stylus (e.g., the pen tip) in relation to a surface, such as a display surface. The stylus transmits IMU data to a computing device to perform the trajectory prediction. The IMU data is analyzed (e.g., via a machine learning mechanism, or some other device/component) and a stylus state is determined to be in one of a constant velocity state, a constant acceleration state, a constant angular velocity and velocity state, or a constant angular velocity and acceleration state. A prediction model to perform the trajectory prediction can be selected based on the current state of the stylus.

15 Claims, 12 Drawing Sheets

(56) References Cited

U.S. PATENT DOCUMENTS

| | | | | |
|---|---|---|---|---|
| 2023/0367420 A1* | 11/2023 | Kwon | ............... | G06F 3/04883 |
| 2024/0077975 A1* | 3/2024 | Lee | ..................... | G06F 3/0442 |
| 2025/0004577 A1* | 1/2025 | Mylarappa Gowda | ..................... | |
| | | | | G06F 3/03545 |

* cited by examiner

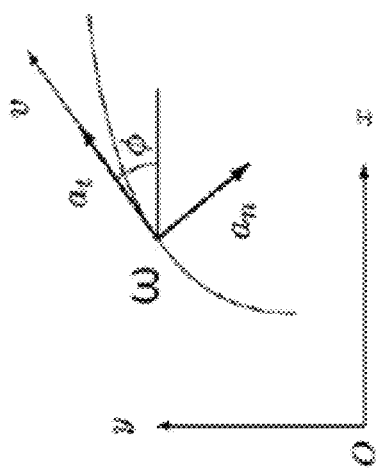

$x'(t) = v(t) \cdot \cos\phi(t)$ (1), $y'(t) = v \cdot t \cdot \text{sen}\phi(t)$ (2), $\phi'(t) = \omega \cdot t$ (3), $v'(t) = a_o \cdot t$ (4)

State space vector: $[x, y, \phi, v, \omega, a]^T$ $$\begin{bmatrix} x_{k+1} \\ y_{k+1} \\ \varphi_{k+1} \\ v_{k+1} \\ \omega_{k+1} \\ a_{k+1} \end{bmatrix}_{CV} = \begin{bmatrix} x_k \\ y_k \\ \varphi_k \\ v_k \\ \omega_k = 0 \\ a_k = 0 \end{bmatrix} + \begin{bmatrix} v_k \cdot \cos(\varphi_k) \Delta t \\ v_k \cdot \sin(\varphi_k) \Delta t \\ 0 \\ 0 \\ 0 \\ 0 \end{bmatrix}$$

FIG. 4A

State space vector: $[x, y, \phi, v, \omega, a]^T$ $$\begin{bmatrix} x_{k+1} \\ y_{k+1} \\ \phi_{k+1} \\ v_{k+1} \\ \omega_{k+1} \\ a_{k+1} \end{bmatrix}_{CA} = \begin{bmatrix} x_k \\ y_k \\ \phi_k \\ v_k \\ \omega_k = 0 \\ a_k \end{bmatrix} + \begin{bmatrix} (v_k \Delta t + \frac{1}{2} a \Delta t^2) \cos(\phi_k) \\ (v_k \Delta t + \frac{1}{2} a \Delta t^2) \sin(\phi_k) \\ 0 \\ a_k \cdot \Delta t \\ 0 \\ 0 \end{bmatrix}$$

FIG. 4B

State Space Vector: $[x, y, \varphi, v, w, a]^T$ $$\begin{bmatrix} x_{k+1} \\ y_{k+1} \\ \varphi_{k+1} \\ v_{k+1} \\ w_{k+1} \\ a_{k+1} \end{bmatrix} = \begin{bmatrix} x_k \\ y_k \\ \varphi_k \\ v_k \\ w_k \\ a_k \equiv 0 \end{bmatrix} + \begin{bmatrix} \frac{v_k}{w_k}\sin(\varphi_k + w_k\Delta t) - \frac{v_k}{w_k}\sin(\varphi_k) \\ -\frac{v_k}{w_k}\cos(\varphi_k + w_k\Delta t) + \frac{v_k}{w_k}\cos(\varphi_k) \\ w_k\Delta t \\ 0 \\ 0 \\ 0 \end{bmatrix}$$

CWV

FIG. 4C

State Space Vector: $[x, y, \varphi, v, w, a]^T$ $$\begin{bmatrix} x_{k+1} \\ y_{k+1} \\ \varphi_{k+1} \\ v_{k+1} \\ w_{k+1} \\ a_{k+1} \end{bmatrix}_{CWA} = \begin{bmatrix} x_k \\ y_k \\ \varphi_k \\ v_k \\ w_k \\ a_k \end{bmatrix} + \begin{bmatrix} \frac{a}{w_k^2}\cos(\varphi_k + w_k \Delta t) + \frac{v_k + a\Delta t}{w_k}\sin(\varphi_k + w_k \Delta t) - \frac{v_k}{w_k}\sin(\varphi_k) \\ \frac{a}{w_k^2}\sin(\varphi_k + w_k \Delta t) - \frac{v_k + a\Delta t}{w_k}\cos(\varphi_k + w_k \Delta t) + \frac{v_k}{w_k}\cos(\varphi_k) \\ w_k \Delta t \\ a_k \Delta t \\ 0 \\ 0 \end{bmatrix}$$

FIG. 4D

STYLUS THREE-DIMENSIONAL TRAJECTORY PREDICTION

BACKGROUND

Various electronic devices, such as laptop computers, tablet computers, smart phones, and displays may allow different input devices to be used by a user. These different input devices have been developed to complement a user's experience while interacting with electronic devices. For example, a stylus may provide input to an electronic device by contacting a surface, such as a display screen, of the electronic device and allow a user to write or draw on the surface. When a stylus, or some other device, is used to write or draw on the surface, there can be a noticeable delay/time lag between the movement of the stylus and the ink appearing on the screen. This time lag can be disconcerting to a user.

SUMMARY

Various embodiments for stylus and pen-tip trajectory prediction are described herein. Using the techniques described herein, an input device, such as a stylus, includes an integrated Inertial Measurement Unit (IMU) (e.g., 3-axis, 6-axis, 9-axis, . . . ) that generates IMU data that can be used to predict a future location of the stylus (e.g., the pen tip) in relation to a surface, such as a display surface. The arrangements detailed herein include a stylus that wirelessly transmits IMU data to a computing device to perform trajectory prediction. The arrangements detailed herein further include algorithms/techniques to perform the predictions. In some cases, different prediction models are selected to perform the predictions based on the IMU data received from the stylus.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for performing trajectory predictions. The method also includes receiving data from an input device, where the data indicates an acceleration and angular velocity of the input device configured to provide input to a computing device. The method also includes determining a position of the input device relative to a touch surface associated with the computing device. The method also includes generating a prediction of one or more future positions of the input device based on the data received from the input device. The method also includes causing an update to content shown on a display based on the one or more future positions. Other embodiments of this aspect include corresponding computer systems, apparatus, and computer programs recorded on one or more computer storage devices, each configured to perform the actions of the methods.

Implementations may include one or more of the following features. The method where the input device may include a stylus that contains an inertial measurement unit (IMU) that includes at least a 3-axis gyroscope and a 3-axis accelerometer. The data is received by a wireless interface of the computing device. Generating the prediction may further be based on second data received from one or more capacitive sensors. Generating the prediction may include selecting a prediction model, from a plurality of prediction models, based on the data. The plurality of prediction models includes a constant velocity prediction model, a constant acceleration prediction model, a constant angular velocity and velocity prediction model, and a constant angular velocity and acceleration prediction model. Selecting the prediction model may include providing the data to a machine learning mechanism; obtaining a stylus state from the machine learning mechanism; and selecting the prediction model is based, at least in part, on the stylus state. The input device transmits the data to the computing device using two different wireless frequencies. Implementations of the described techniques may include hardware, a method or process, or computer software on a computer-accessible medium.

One general aspect includes a system for performing trajectory predictions. In some examples, the system also includes a display, and a touch surface. The system also includes a wireless interface configure to receive data from an input device, where the data indicates an acceleration and angular velocity of the input device. The system also includes a processor configured to: determine a position of the input device relative to the touch surface, generate a prediction of one or more future positions of the input device based on the data received from the input device, and cause an update to content shown on the display based on the one or more future positions. Other embodiments of this aspect include corresponding computer systems, apparatus, and computer programs recorded on one or more computer storage devices, each configured to perform the actions of the methods.

Implementations may include one or more of the following features. The system where the input device may include a stylus that contains an inertial measurement unit (IMU) that includes at least a 3-axis gyroscope and a accelerometer. Generating the prediction may include selecting a prediction model, from a plurality of prediction models, based on the data. The plurality of prediction models includes a constant velocity prediction model, a constant acceleration prediction model, a constant angular velocity and velocity prediction model, and a constant angular velocity and acceleration prediction model. Selecting the prediction model may include providing the data to a machine learning mechanism; and obtaining a stylus state from the machine learning mechanism, The system may include selecting the prediction model is based, at least in part, on the stylus state. The wireless interface is further configured to receive the data via a universal stylus initiative (USI) communication protocol. Implementations of the described techniques may include hardware, a method or process, or computer software on a computer-accessible medium.

One general aspect includes a non-transitory computer-readable medium containing computer executable instructions for performing trajectory predictions. The non-transitory computer-readable medium containing computer executable instructions also include accessing data received from an input device configured to provide input to a computing device, where the data indicates an acceleration and angular velocity of the input device. The instructions also include determining a position of the input device relative to a touch surface associated with the computing device. The instructions also include generating a prediction of one or more future positions of the input device based on the data received from the input device. The instructions also include causing an update to content shown on a display based on the one or more future positions. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the input device may include a stylus that contains an inertial measurement unit (IMU) that includes at least a 3-axis gyroscope and a 3-axis accelerometer. Generating the prediction may include selecting a prediction model, from a plurality of prediction models, based on the data. The plurality of prediction models includes a constant velocity prediction model, a constant acceleration prediction model, a constant angular velocity and velocity prediction model, and a constant angular velocity and acceleration prediction model. Selecting the prediction model may include providing the data to a machine learning mechanism; obtaining a stylus state from the machine learning mechanism; and where selecting the prediction model is based, at least in part, on the stylus state. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4A illustrates an example constant velocity prediction model, according to some embodiments.

FIG. 4B illustrates an example constant acceleration prediction model, according to some embodiments.

FIG. 4C illustrates an example constant angular velocity and velocity prediction model, according to some embodiments.

FIG. 4D illustrates an example constant angular velocity and acceleration prediction model, according to some embodiments.

DETAILED DESCRIPTION

Figure 1:
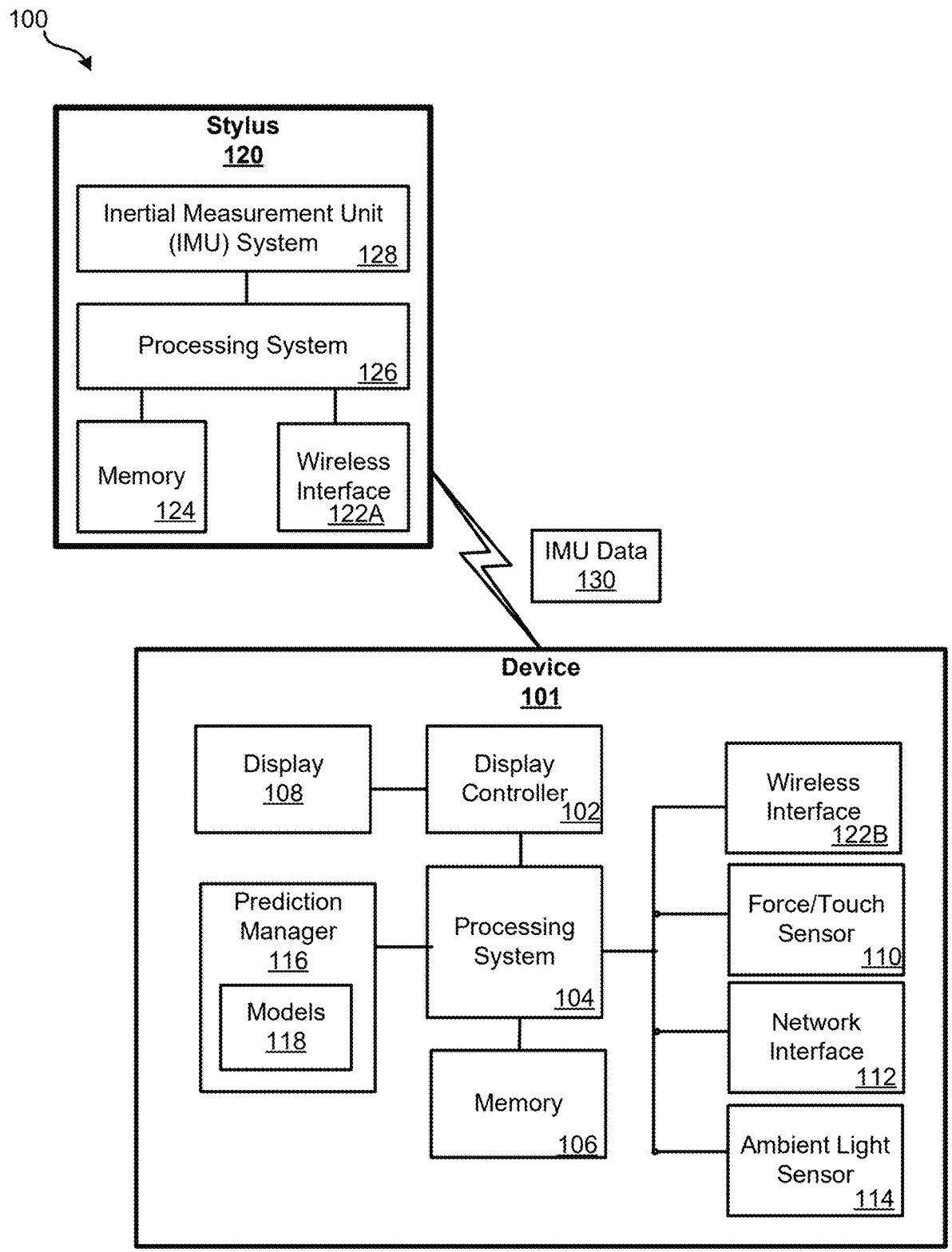
FIG. 1 illustrates a system in which a stylus transmits IMU data to a computing device for 3D trajectory prediction, according to some embodiments.

Techniques are described herein that are directed to three-dimensional trajectory prediction of a stylus. The techniques are directed to reducing the lag/delay between when the stylus interacts with a surface, such as a display, and when digital ink is displayed. Using the techniques described herein, an input device, such as a stylus, includes an integrated Inertial Measurement Unit (IMU) (e.g., 3-axis, 6-axis, 9-axis, . . . ) that generates IMU data that can be used to predict a future location of the stylus (e.g., the pen tip) in relation to a surface, such as a display surface. The arrangements detailed herein include a stylus that wirelessly transmits IMU data from the stylus to a computing device to generate the trajectory predictions.

In some examples, the IMU data is transmitted in a same frame, but at a different frequency from the USI data, according to the USI communication protocol. In other examples, the IMU data can be transmitted using some other wireless protocol (e.g., Bluetooth). The arrangements detailed herein further can include algorithms/techniques to perform the prediction. In some cases, different prediction models are selected to perform the prediction based on the IMU data received from the stylus.

According to some configurations, the IMU data is analyzed to determine a state of the stylus. In some examples, the IMU data is analyzed (e.g., via a machine learning mechanism, or some other device/component) and classifies the stylus to be in one of a constant velocity state, a constant acceleration state, a constant angular velocity and velocity state, or a constant angular velocity and acceleration state. A prediction model to perform the trajectory prediction can be selected based on the current state of the stylus.

As opposed to using a prediction model, that is based on priori and present e-ink trajectory to estimate motion states, the techniques described herein use real-time IMU data to perform predictions. For instance, as opposed velocity and acceleration state updates based on past e-ink trajectory and its corresponding timestamp with respect to the last received e-ink, the stylus provides IMU data in real-time. Another benefit over existing techniques, is that the techniques described herein can provide accurate predictions even with instantaneous changes in stylus velocity, angular velocity and/or acceleration of the stylus. Existing techniques do not work provide good predictions when there are instantaneous changes in stylus velocity, angular velocity and/or acceleration. Additionally, the existing prediction techniques are based on a two-dimensional state-space model, which is limited to improving the in-plane drag latency of a tablet/phone devices.

As briefly discussed above, instead of using a single prediction model to perform the trajectory model, different prediction models can be selected at different times based on the current state of the stylus. In this way, a more accurate prediction can be generated. Using the techniques described herein, the lag can be significantly reduced as compared to existing techniques. For instance, in some cases, the ink may even be displayed before the stylus actually touches the surface. This reduction in lag can significantly improve the experience of the user. According to some examples, a prediction error for the difference between the position of where the stylus is located on the surface and the predicted position can be used to update one or more of the prediction models. As such, the prediction models can adapt to provide better predictions.

Many types of computing devices can benefit from the use of the techniques described herein. For example, smart-phones, gaming devices, e-readers, personal digital assistants (PDAs), digital paper tablets, and smart picture frames may benefit from various embodiments of the prediction techniques as detailed herein. Furthermore, the electronic device may be an assistant device (e.g., Google® Nest® Hub; Google® Nest® Hub Max); a home automation controller (e.g., controller for an alarm system, thermostat, lighting system, door lock, motorized doors, etc.); a gaming device (e.g., a gaming system, gaming controller, data glove, etc.); a communication device (e.g., a smart phone such as a Google® Pixel® Phone, cellular phone, mobile phone, wireless phone, portable phone, radio telephone, etc.); and/or other computing device (e.g., a tablet computer such as the Pixel® Tablet, phablet computer, notebook computer, laptop computer, etc.).

Embodiments detailed herein can also be used to improve the resultant ink that is displayed. For example, the IMU data can be used to determine the stylus orientation. Stylus orientation can advantageously be used to affect stroke width and brightness of a resultant line displayed on the touch panel, thereby improving the realism of the stylus experience. Additional benefits of including an integrated IMU within a stylus includes providing better resolution on stylus pen-to-display orientation accuracy, and power consumption of the stylus. For example, the stylus can be turned off along with sensing and communication functions, when no motion or hand-grabbing motion is detected. Further, existing orientation accuracy for tablet is of 5° due to limited ring capacitor sensing SNR, whereas a 16-bit accel and gyro can easily provide sub-degree orientation accuracy with sensor fusion algorithm.

Further details regarding such embodiments and others is provided in relation to the figures. FIG. 1 illustrates a system 100 in in which a stylus 120 transmits IMU data to a computing device 101 for 3D trajectory prediction, according to some embodiments. System 100 includes stylus 120 and device 101. Some components of stylus 120 are illustrated. Specifically, stylus 120 includes: wireless interface 122; memory 124; processing system 126; and IMU system 128. All components of the stylus can be housed by housings of the stylus, which can be made from a rigid or semi-rigid material.

Communication between stylus 120 and device can occur via different communication protocols, such as but not limited to a Universal Stylus Initiative (USI) communication protocol, a low-power device-to-device communication protocol, such as Bluetooth Low Energy (LE) Audio, or some other wireless protocol. Wireless interfaces 122 can be a short-range wireless interface that allows for a device-to-device exchange of data. For example, short-range refers to up to 1, 10, 15, or 20 meters. Wireless interface 122 can be a USI interface, a Bluetooth interface, and/or some other interface that allows for data to be exchanged according to a communication protocol (e.g., USI, from the Bluetooth family of communication protocols, such as Bluetooth basic rate or extended data rate (BR/EDR, which can also be referred to as "Bluetooth classic"), and Bluetooth Low Energy (BLE) protocol). Wireless interface 122 can communicate using one or more bands (e.g., the 2.4 GHz band, the 5.0 GHz band, . . . ). These frequency bands can be divided up into channels, such as 80 channels for Bluetooth BDR/EDR, each 1 MHz wide, or 40 channels for Bluetooth LE, which are each 2 MHz wide. Bluetooth communications can involve frequent channel changes within the 2.4 GHz band, such as up to 1600 channel changes per second. Wireless interface 122A can communicate with other wireless interfaces (e.g., wireless interface 122B) that conform to the standard used by the stylus.

FIG. 1 illustrates an embodiment of a device 101 that includes a display 108 that is configured to interact with stylus 120. Device 100 can include: a display controller 102; processing system 104; memory 106; display 108; force/touch sensor 110; network interface 112, ambient light sensor 114, wireless interface 122B, as well as other components/functionality not shown.

In some examples, device 101 is a smart device that can connect to one or more networks and communicating with one or more other computing devices. In some implementations, an environment can include intelligent, multi-sensing, network-connected devices that integrate seamlessly with each other in a smart-home network and/or with a central server or a cloud-computing system to provide a variety of useful smart-home functions. Any network-connected or network-connectable device having processing capabilities, and optionally also sensing capabilities, and that is deployed or is suitable for being deployed in an environment, such a home environment, so that the device may be controlled via a wired and/or wireless network and may optionally interact with one or more other such devices may be referred to as a "smart-home device" or "smart device". In other examples, device 100 may not be configured to connecting to other network-connected devices.

Device 101 may include a processing system 104 that includes one or more processors that may execute special-purpose software stored in a memory 106. Processing system 104 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD).

In some embodiments, device 101 may connect to one or more other computing devices via network interface 112, and/or wireless interface 122B. For example, device 101 may use network interface 112/wireless interface 122B to connect with mobile computing devices, tablet computing devices, server computing devices, and the like. Devices may further communicate with each other via a connection (e.g., network interface 112) to a network, such as the Internet (not shown). Through the Internet, the smart devices may communicate with a server system, such as server system (not shown) (also called a central server system and/or a cloud-computing system herein). The server system may be associated with a manufacturer, support entity, or service provider associated with the smart device(s). In some implementations, software updates are automatically sent from the server system to smart devices (e.g., when available, when purchased, or at routine intervals).

Device 101 can include one or more sensors, such as a force/touch sensor 110 (which may be referred to herein as a "force touch sensor", an ambient light sensor 114, as well as other sensors. Ambient light sensor 114 may sense the amount of light present in the environment of device 101. Measurements made by ambient light sensor 114 may be used to adjust the brightness of electronic display 108. For example, the display controller 102 may use data from the ambient light sensor 114 to detect light conditions and adjust the brightness of the display 108 based on the detected light conditions. In some embodiments, ambient light sensor 114 senses an amount of ambient light through a cover (not shown). Therefore, compensation for the reflectivity of the cover may be made such that the ambient light levels are correctly determined via ambient light sensor 114. A light pipe may be present between ambient light sensor 114 and the cover such that in a particular region of the cover, light that is transmitted through the cover, is directed to ambient light sensor 114, which may be mounted to a printed circuit board (PCB), such as a PCB to which processing system 104 is attached.

Processing system 104 may output information for presentation to electronic display 108. Processing system 104 can receive information from force touch sensor 110, ambient light sensor 114, stylus 120, other devices (e.g., smart devices) and in some examples from one or more other sensors. Processing system 104 can perform bidirectional communication with network interface 112/wireless interface 122B.

In some embodiments, processing system 104 executes one or more software applications or services stored on or otherwise accessible by device 101. For example, one or more components of device 100, such as display controller 102, may include one or more software applications or software services that may be executed by processing system 104. In some configurations, the one or more software applications may include processing functionality configured to perform operations described herein.

According to some configurations, the prediction model performs operations that are directed to reducing the lag/delay between when the stylus interacts with a surface, such as a surface of display 108, and when digital ink is displayed on the display. As illustrated, stylus 120 includes an integrated Inertial Measurement Unit (IMU) system (e.g., 3-axis, 6-axis, 9-axis, . . . ) that generates IMU data and transmits the IMU data 130 via the wireless interface 122A to the device 101. In some examples, the IMU data 130 is transmitted in a same frame, but at a different frequency from the USI data according to the USI protocol. In other examples, the IMU data 130 can be transmitted using some other wireless protocol.

According to some configurations, the IMU data 130 received by device 101 is analyzed by the prediction manager 116 to determine a current state of the stylus. In some examples, prediction manager 130 analyzes the IMU data 130 via a machine learning mechanism that classifies the stylus state as one of a constant velocity state, a constant acceleration state, a constant angular velocity and velocity state, or a constant angular velocity and acceleration state. More or fewer stylus states can be determined by the prediction manager 116.

As briefly discussed above, different models can be used to perform the trajectory prediction. In some examples, the prediction manager 116 selects a mode; from models 118 based on the determined stylus state. As opposed to using a single prediction model, or a model that is based on priori and present e-ink trajectory and motion states, the prediction manager 116 selects a model from different prediction models 118. Different models can be selected at different times based on the current state of the stylus. In this way, a more accurate prediction can be generated.

Using the techniques described herein, the lag can be significantly reduced as compared to existing techniques. For instance, in some cases, the ink may even be displayed before the stylus touches the surface. This reduction in lag can significantly improve the experience of the user. According to some examples, a prediction error for the difference between the position of where the stylus is located on the surface and the predicted position can be used to update one or more of the prediction models. As such, the prediction models can be adapted to provide better predictions.

Display 108 may be a light-emitting diode (LED) display, an organic light-emitting diode (OLED) display, or other suitable display. In some examples, display 108 includes pixels that can be individually turned on or off. Display 108 may be rectangular and may have four peripheral edges (e.g., right, left, top, and bottom edges that run around the outer periphery of display 108). Generally, an LED/OLED display includes LEDs/OLEDs configured in a particular pattern (e.g., an x-y grid) that emit light when a voltage is applied to the diode. If an OLED display is used, the organic layers for the OLEDs can be patterned and deposited on a substrate that includes a backplane. The backplane can include switching and driving circuitry for the OLEDs. The substrate can be encapsulated, forming an OLED display. In some implementations, the substrate can include a rigid, non-bendable material such as a rigid glass panel or a rigid plastic panel. In some implementations, the substrate can include a bendable material that can include, but is not limited to, plastic, metal, or flexible glass. OLED displays, dependent on the substrate, can be viewed from both the front and the back of the display.

Force touch sensors 110 may be implemented using capacitive touch sensors, acoustic touch sensors, piezoelectric touch sensors or other force-sensing components, optical touch sensors, resistive touch sensors, or other touch sensitive components. Touch sensors 110 may be implemented in an array of rows and columns (as an example). In a typical scenario, touch sensors 110 may be implemented as an array of capacitive sensor electrodes formed from a conductor such as indium tin oxide and may be integrated into one of the layers of display 108 to form a touch screen display. Other types of configurations may be used if desired (e.g., to implement touch sensitive buttons, to implement one-dimensional sliders based on touch technology, etc.).

Processing system 144 may include one or more special-purpose or general-purpose processors. Such special-purpose processors may include processors that are specifically designed to perform the functions of the components detailed herein, such as detailed in relation to processing systems 126.

Figure 2:
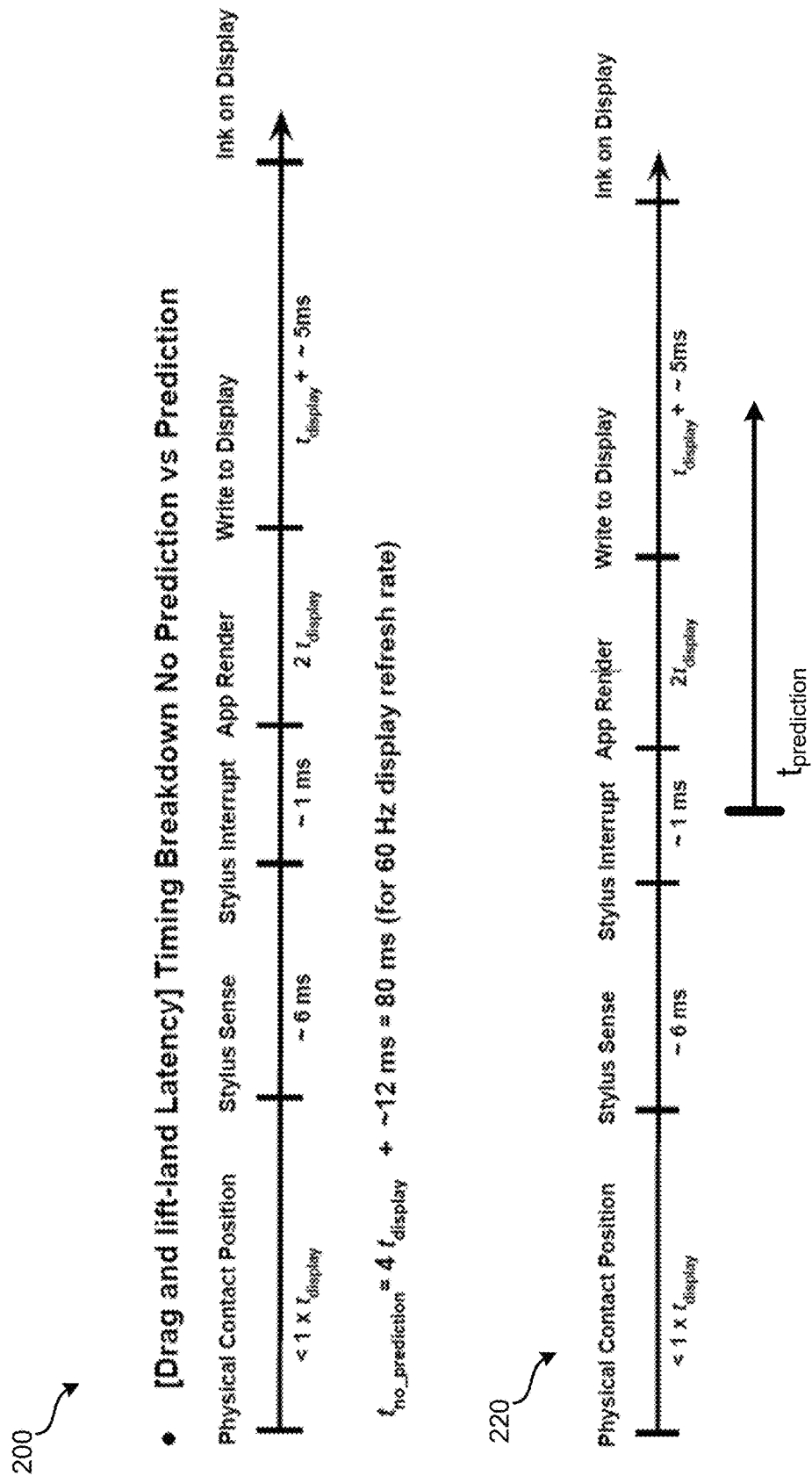
FIG. 2 illustrates a diagram showing the reduction of latency using 3D trajectory prediction for a stylus that includes an IMU, according to some embodiments.

FIG. 2 illustrates diagrams showing the reduction of latency using 3D trajectory prediction for a stylus that includes an IMU, according to some embodiments.

As illustrated, diagram 200 shows an example of latency between when a stylus is detected on the surface of a display and the rendering of ink on the display. The times illustrated in FIG. 12 are associated with a display refresh rate of 60 Hz. Other refresh rates and/or capabilities of the computing device and surface can change the delays illustrated. For example, the times may change depending on various factors such as the refresh rate of the display, the sensors used by the surface that detects the stylus, the processing capabilities of the computing device, and the like. Referring to diagram 200, it can be seen that when there is no prediction, a lag of 80 ms exists between when a user places the ink on the surface and when the ink is displayed on the surface. As discussed above, this lag can be disconcerting and cause an unsatisfactory experience to the user.

Diagram 220 shows an example of the reduction of the latency between when a stylus is detected on the surface of a display and the rendering of ink on the display when techniques described herein for three-dimensional trajectory prediction of the stylus are performed. As illustrated, since the techniques described herein use IMU data provided by the stylus, the ink can be displayed even before the stylus touches the surface. In some examples, the ink is displayed at a time that causes the ink to be displayed at the moment when the stylus is predicted to touch the surface. In other examples, the ink may be displayed slightly after the stylus touches or is predicted to touch the surface.

Figure 3:
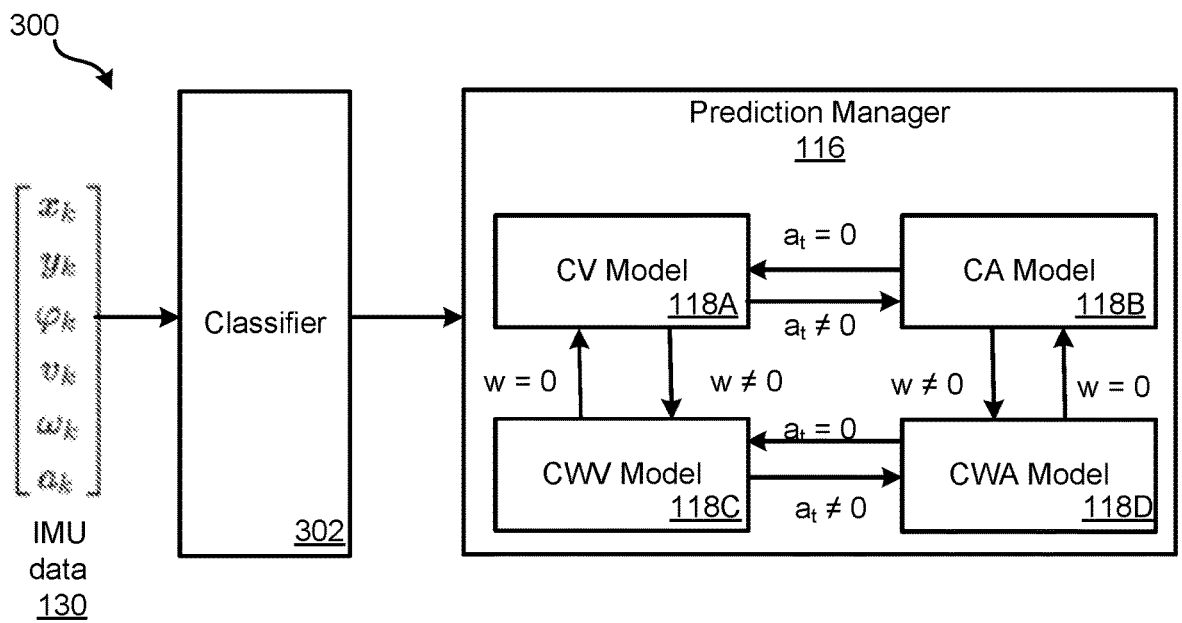
FIG. 3 illustrates an example system for using different prediction models, according to some embodiments.

FIG. 3 illustrates an example system 300 for using different prediction models, according to some embodiments. FIG. 3 includes further details regarding prediction manager 116 as illustrated in FIG. 1. System 300 includes classifier 302, and prediction manager 116. Prediction manager 116 illustrates four different prediction models, including a constant velocity prediction model 118A, a constant acceleration prediction model 118B, a constant angular velocity and velocity prediction model 118C, and a constant angular velocity and acceleration prediction model 118D.

As illustrated, classifier 302 receives IMU data 130 that is transmitted from an input device, such as stylus 120. IM data 130 can include different data depending on the type of IMU system used (e.g., 3-axis, 6-axis, 9-axis, . . . ). In some examples, the IMU data 130 is analyzed by the classifier 302 to determine a state of the stylus. In some configurations, the classifier is a pre-trained neural network that is configured to classify the stylus to be in one of a constant velocity state, a constant acceleration state, a constant angular velocity and velocity state, or a constant angular velocity and acceleration state. In other examples, a different machine learning technique can be used to determine the current stylus state.

In some examples, the prediction manager 116 selects a model from models 118 based on the determined stylus state. As opposed to using a single prediction model, or a model that is based on priori and present e-ink trajectory and motion states, the prediction manager 116 selects a model from different prediction models 118. Different models can be selected at different times based on the current state of the stylus. For example, when the stylus state is detected to be a constant velocity state, the CV model 118A is used to perform the trajectory prediction. See FIG. 4A for a state-space model used in this example. When the stylus state is detected to be a constant acceleration state, the CA model 118B is used to perform the trajectory prediction. See FIG. 4B for a state-space model used in this example. When the stylus state is detected to be a constant angular velocity and velocity state, the CWV model 118C is used to perform the trajectory prediction. See FIG. 4C for a state-space model used in this example. When the stylus state is detected to be a constant angular velocity and acceleration state, the CWA model 118D is used to perform the trajectory prediction. See FIG. 4D for a state-space model used in this example. Using the techniques described herein, the lag can be significantly reduced as compared to existing techniques. For instance, in some cases, the ink may even be displayed before the stylus touches the surface. This reduction in lag can significantly improve the experience of the user.

Figure 5:
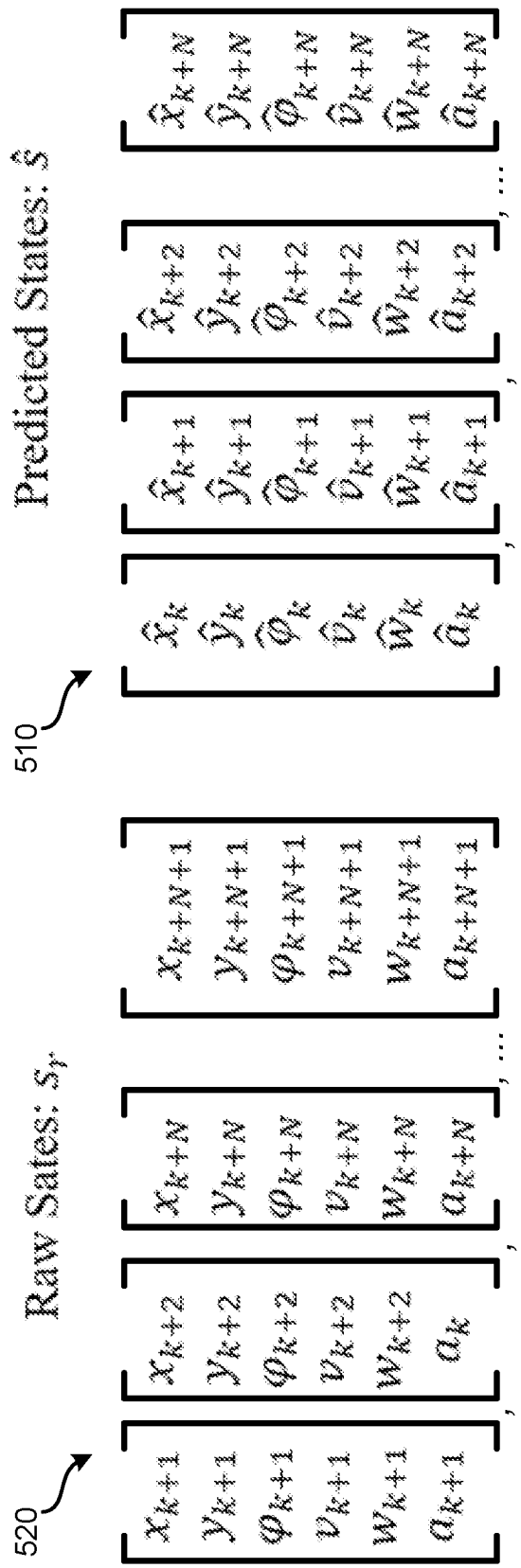
FIG. 5 illustrates an example diagram showing predicted states and raw states, according to some embodiments.

FIG. 5 illustrates an example diagram showing predicted states 510 and raw states 520, according to some embodiments. According to some examples, a prediction error for the difference between the position of where the stylus is located/detected on the surface and the predicted position can be used to update one or more of the prediction models. As such, the prediction models can adapt to provide better predictions. For example, one or more of the prediction models 118 can be updated based on the prediction data.

Figure 6:
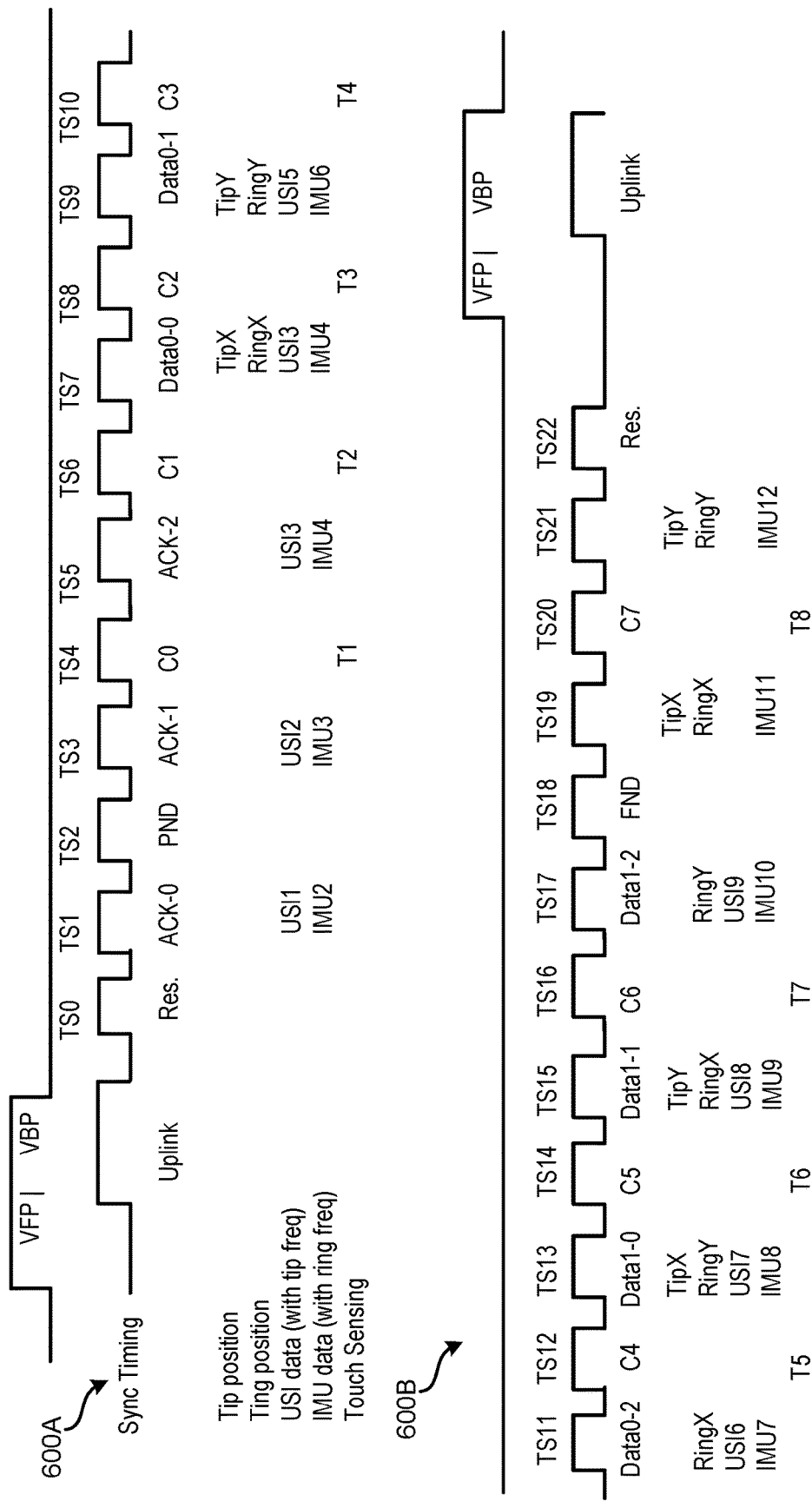
FIG. 6 illustrates an example timing diagram for transmitting IMU data to a computing device, according to some embodiments.

FIG. 6 illustrates example timing diagrams 600A and 600B for transmitting IMU data to a computing device, according to some embodiments. As illustrated, the IMU data 130 is transmitted according to a modified USI protocol. As discussed above, other wireless protocols can be used to transmit the IMU data 130 to the computing device 101. In the current example, PND refers to the stylus noise detect. FND refers to finger noise detect. Res refers to reserved. ACK-0, ACK-1, ACK-2 refers to a first downlink acknowledgment. Data0-0, Data0-1, Data0-2 refers to a second downlink-pressure. Data1-0, Data1-1, Data1-2 refers to a third downlink-pressure. C0, C1, C2, C3, C4, C5, C6, and C7 refer to touch sensing slots.

As illustrated, the IMU data 130 is transmitted using twelve time slots using the ring frequency. In the current example, the twelve time slots can be used to transmit 16-bit 6 axis IMU data, where each time slot transmits 8 bits. In the current example, a different frequency is used to transmit the IMU data 130 as compared to the frequency to transmit the USI data.

Figure 7:
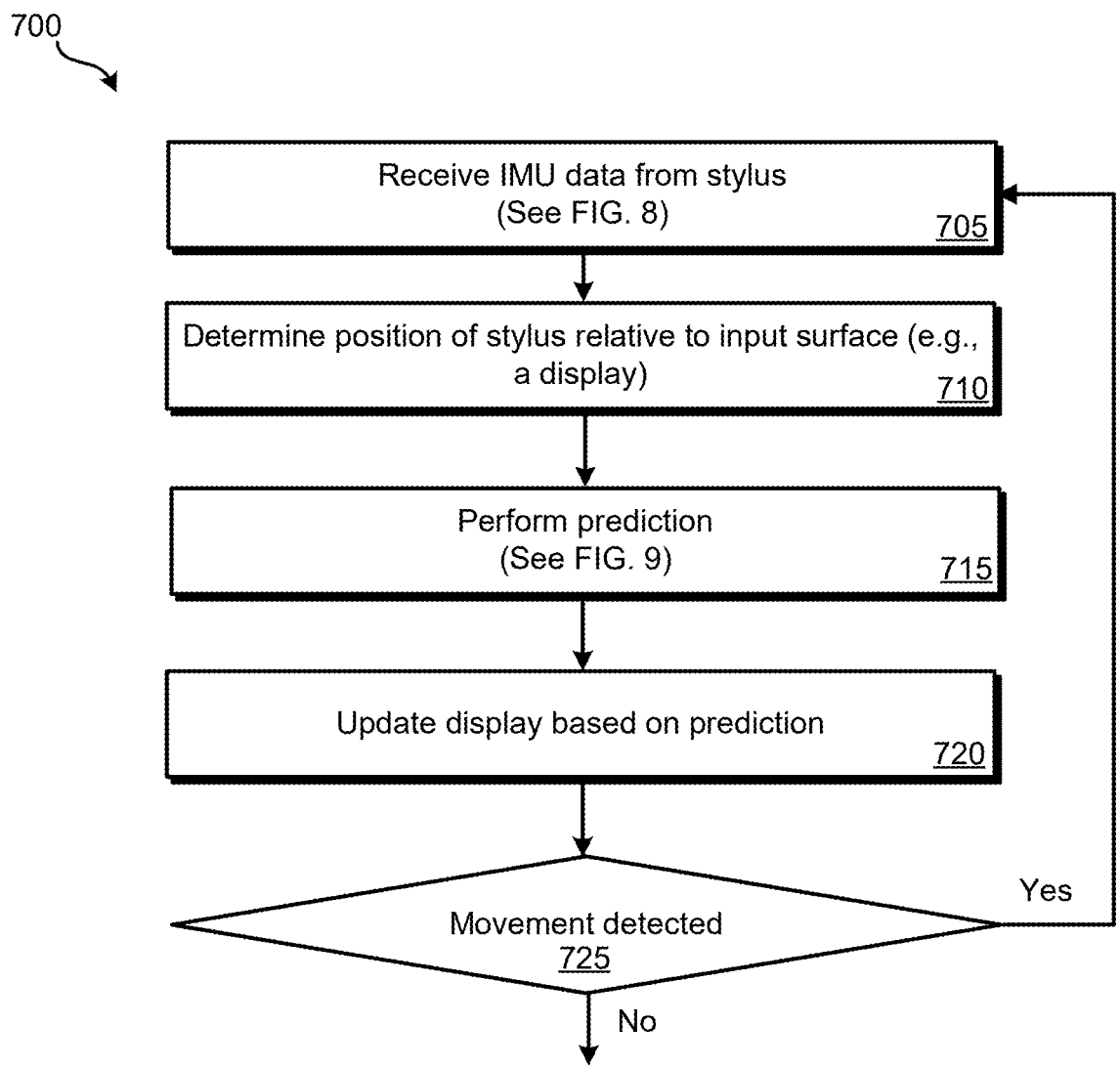
FIG. 7 illustrates an example process for performing 3D trajectory prediction of a stylus, according to some embodiments.

Various methods may be performed using the systems, states, and arrangements detailed in relation to FIGS. 1-6. FIG. 7 illustrates an example process for performing 3D trajectory prediction of a stylus, according to some embodiments. Method 700 can be used by the device 101 to perform the 3D trajectory prediction.

At 705, IMU data is received from the stylus. As discussed above, IMU data 130 can be obtained directly from the stylus 120. Generally, the IMU data 130 is transmitted from a stylus 120 that includes an integrated Inertial Measurement Unit (IMU) (e.g., 3-axis, 6-axis, 9-axis, . . . ). See FIG. 8 and related discussion for more details.

At 710, a position of the stylus is determined that is relative to the input surface. As discussed above, the computing device 101 may include force/touch sensors 110 that are configured to detect when a stylus 120 has touched the surface (e.g., of display 108) and/or when the stylus 120 (e.g., a tip of the stylus) is near the surface. For examples, the force/touch sensors 110 can be detected when the tip of the stylus is within a pre-determined range of the stylus 120.

At 715, the prediction is performed. As discussed above, instead of using a single prediction model to perform the trajectory model, different prediction models can be selected at different times based on the current state of the stylus. In some examples, the prediction model selected is based on a current state of the stylus. According to some examples, both IM data received by the stylus and data received from the force/touch sensors can be used to generate the prediction. See FIG. 9 and related description for more details.

At 720, the display is updated based on the prediction. As discussed above, using the techniques described herein, the display 108 can be updated using the prediction(s) generated at 715. In some cases, the display 108 may be updated at a time that is substantially contemporaneously with when the tip of the stylus touches the surface (e.g., of display 108).

At 725, a determination is made as to whether movement of the stylus is detected. When movement is detected, the process may return to 705. When movement is not detected, the process can return to processing other actions.

Figure 8:
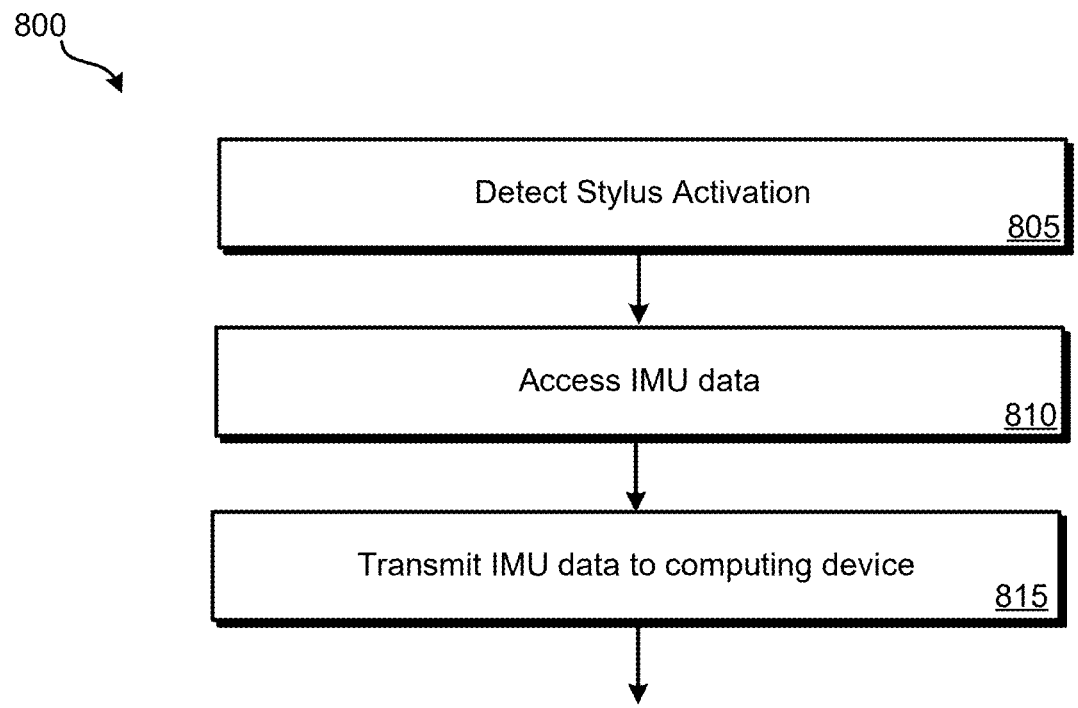
FIG. 8 illustrates an example process for receiving 3D data from a stylus, according to some embodiments.

FIG. 8 illustrates an example process 800 for transmitting IMU data from a stylus to a computing device 101, according to some embodiments. Method 800 can be used by the stylus 120, and/or some other device that generates IMU data.

At 805, the stylus 120 activation is detected. As briefly discussed above, the stylus 120 may be in a low-power state during times when no motion or hand-grabbing motion is detected.

At 810, the IMU data 130 is accessed. As discussed above, an IMU system 128 of the stylus 120 can be configured to generate IMU data 130 during times the stylus 120 detects that the stylus is in use.

At 815, the IMU data 130 is transmitted to the device 101. As discussed above, in some examples, the IMU data 130 is transmitted at a different frequency from the USI data according to the USI protocol. In other examples, the IMU data 130 can be transmitted using some other wireless protocol, such as but not limited to a Bluetooth protocol.

Figure 9:
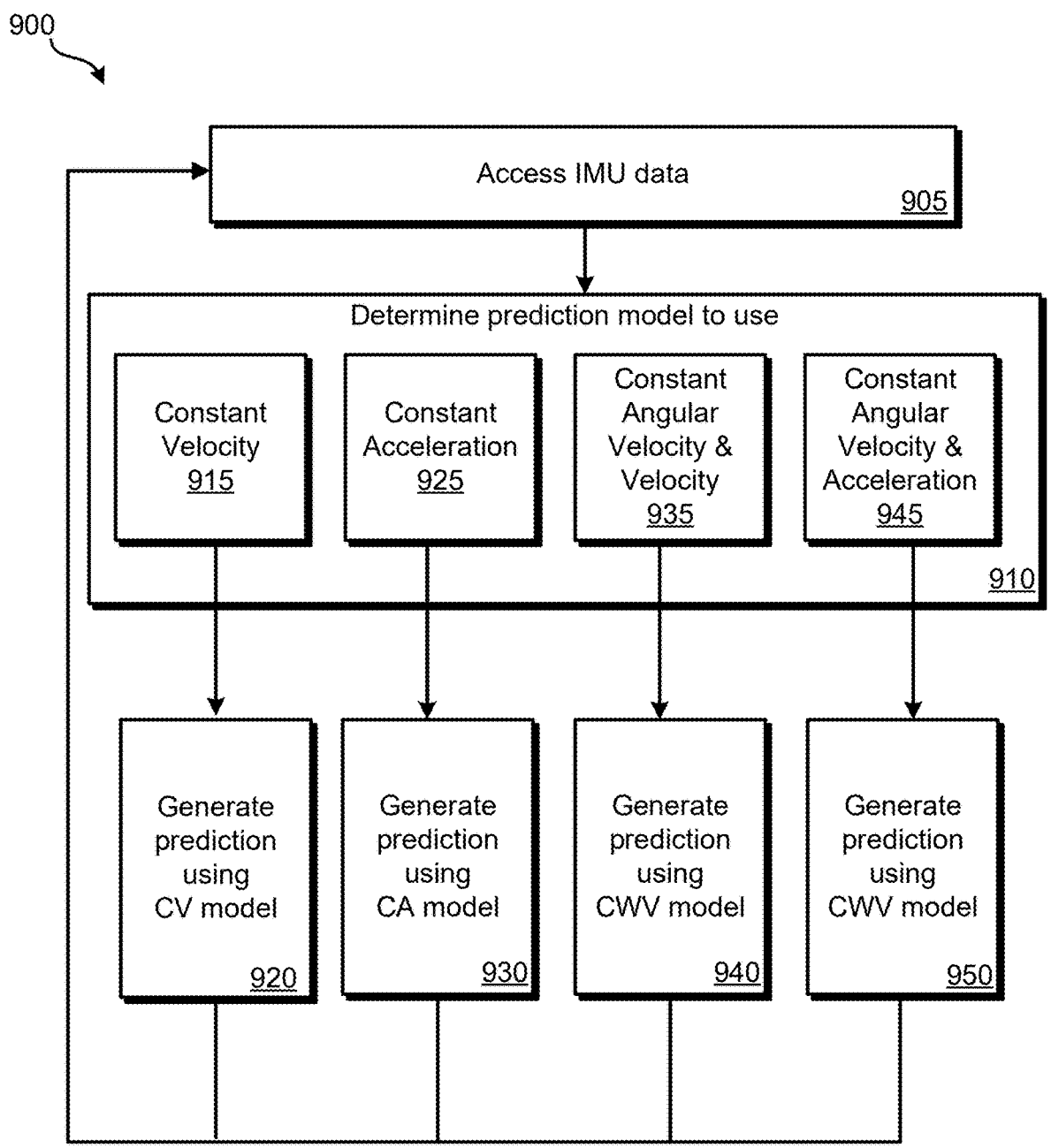
FIG. 9 illustrates an example process for performing 3D trajectory prediction using different models, according to some embodiments.

FIG. 9 illustrates an example process 900 for performing 3D trajectory prediction using different models, according to some embodiments.

At 905, IMU data 130 is accessed. As discussed above, the IMU data 130 can be received directly from the stylus 120. In some examples, the IMU data 130 may be stored in a memory 106 of the device 101 until it is used for generating the predictions.

At 910, the prediction model to use is determined. As discussed above, the prediction model 118 selected can be based on a current stylus state. In some examples, a classifier 302 receives the current IMU data 130 from the stylus 120 and generates the current stylus state.

At 915, when the stylus is in a constant velocity state, the process moves to 920, where a prediction is generated using the CV model 118.

At 925, when the stylus is in a constant acceleration state, the process moves to 930, where a prediction is generated using the CA model 118.

At 935, when the stylus is in a constant angular velocity and velocity state, the process moves to 940, where a prediction is generated using the CWV model 118.

At 945, when the stylus is in a constant angular velocity and acceleration state, the process moves to 940, where a prediction is generated using the CWV model 118. When the stylus is not in the constant velocity state, the constant acceleration state, the constant angular velocity and velocity state, or the constant angular velocity and acceleration state, the process returns to 905.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for performing trajectory predictions comprising:
   receiving data from a stylus configured to provide input to a computing device, wherein the data indicates an acceleration and angular velocity of the stylus;
   determining a position of the stylus relative to a touch surface associated with the computing device;
   selecting a prediction model from a plurality of prediction models based on the data, wherein the plurality of prediction models includes a constant velocity prediction model, a constant acceleration prediction model, and constant angular velocity models that include a constant angular velocity and velocity prediction model, and a constant angular velocity and acceleration prediction model;
   generating a prediction, using the prediction model, of one or more future positions of the stylus based on the data received from the stylus; and
   causing an update to content shown on a display based on the one or more future positions.

2. The method of claim 1 wherein the stylus contains an Inertial Measurement Unit (IMU) that includes at least a 3-axis gyroscope.

3. The method of claim 2, wherein the IMU further includes one or more accelerometers.

4. The method of claim 1, wherein generating the prediction is further based on second data received from one or more capacitive sensors.

5. The method of claim 1, wherein selecting the prediction model comprises:
   providing the data to a machine learning mechanism; and
   obtaining a stylus state from the machine learning mechanism.

6. The method of claim 1, wherein the stylus transmits the data to the computing device using two different wireless frequencies.

7. A system comprising:
   a display;
   a touch surface;
   a wireless interface configured to receive data from an input device, wherein the data indicates an acceleration and angular velocity of the input device; and
   a processor configured to:
      determine a position of the input device relative to the touch surface;
      select a prediction model from a plurality of prediction models based on one or more of the data, or second data obtained from one or more capacitive sensors, wherein the plurality of prediction models includes a constant velocity prediction model, a constant acceleration prediction model, and constant angular velocity models that include a constant angular velocity and velocity prediction model, and a constant angular velocity and acceleration prediction model;

generate a prediction, using the prediction model, of one or more future positions of the input device based on the data received from the input device; and cause an update to content shown on the display based on the one or more future positions.

8. The system of claim 7, wherein the input device comprises a stylus that contains an Inertial Measurement Unit (IMU) that includes at least a 3-axis gyroscope and one or more accelerometers.

9. The system of claim 7, wherein selecting the prediction model comprises:

providing the data to a machine learning mechanism; and obtaining a stylus state from the machine learning mechanism.

10. The system of claim 9, wherein selecting the prediction model is based, at least in part, on the stylus state.

11. The system of claim 7, wherein the wireless interface is further configured to receive the data via a Universal Stylus Initiative (USI) communication protocol.

12. A non-transitory computer-readable medium containing computer executable instructions that, when executed by a processor, cause the processor to perform a method, the method comprising:

accessing data received from a stylus configured to provide input to a computing device, wherein the data indicates an acceleration and angular velocity of the stylus;

determining a position of the stylus relative to a touch surface associated with the computing device;

selecting a prediction model from a plurality of prediction models, wherein the plurality of prediction models includes a constant velocity prediction model, a constant acceleration prediction model, and constant angular velocity models that include a constant angular velocity and velocity prediction model, and a constant angular velocity and acceleration prediction model;

generating a prediction, using the prediction model, of one or more future positions of the stylus based on the data received from the stylus; and causing an update to content shown on a display based on the one or more future positions.

13. The non-transitory computer-readable medium of claim 12, wherein the stylus contains an Inertial Measurement Unit (IMU) that includes at least a 3-axis gyroscope and one or more accelerometers.

14. The non-transitory computer-readable medium of claim 12, wherein selecting the prediction model is based on one or more of the data or second data obtained from one or more capacitive sensors.

15. The non-transitory computer-readable medium of claim 12, wherein selecting the prediction model comprises:

providing the data to a machine learning mechanism;

obtaining a stylus state from the machine learning mechanism; and wherein selecting the prediction model is based, at least in part, on the stylus state.

\* \* \* \* \*